(12) United States Patent
Sir et al.

(10) Patent No.: US 6,706,099 B2
(45) Date of Patent: Mar. 16, 2004

(54) FRAGRANT INK WITH MICROCAPSULE COMPOUNDS TO PROVIDE FRAGRANCE

(75) Inventors: In-Shan Sir, Kaohsiung (TW); Yu-Chang Shen, Taipei (TW); Chia-Hsin Chien, Taoyuan (TW); Yu-Ting Lin, Lujou (TW)

(73) Assignee: Benq Corporation (TW)

( * ) Notice: Subject to any disclaimer, the term of this patent is extended or adjusted under 35 U.S.C. 154(b) by 0 days.

(21) Appl. No.: 10/293,437

(22) Filed: Nov. 14, 2002

(65) Prior Publication Data

US 2003/0094117 A1 May 22, 2003

(30) Foreign Application Priority Data

Nov. 14, 2001 (TW) ........................... 90128260 A

(51) Int. Cl.$^7$ ............................................. C09D 11/00
(52) U.S. Cl. ................. 106/31.02; 106/31.32; 106/31.33; 106/31.64; 106/31.65
(58) Field of Search ............. 106/31.02, 31.32, 106/31.33, 31.64, 31.65

(56) References Cited

U.S. PATENT DOCUMENTS

| | | | | |
|---|---|---|---|---|
| 3,888,689 A | * | 6/1975 | Maekawa et al. | 106/31.02 |
| 5,018,974 A | * | 5/1991 | Carnahan et al. | 434/98 |
| 5,039,243 A | * | 8/1991 | O'Brien | 401/49 |
| 5,474,805 A | * | 12/1995 | Vaughn | 427/207.1 |
| 6,123,757 A | * | 9/2000 | Yang et al. | 106/31.02 |
| 6,261,347 B1 | * | 7/2001 | Moreland | 106/31.02 |
| 6,454,842 B1 | * | 9/2002 | Vernardakis et al. | 106/31.02 |
| 2002/0178515 A1 | * | 12/2002 | Moldenhauer et al. | 8/494 |
| 2003/0005853 A1 | * | 1/2003 | Leu et al. | 106/31.02 |

OTHER PUBLICATIONS

Derwent abstract of JP76/046004, Dec. 1976.*

* cited by examiner

Primary Examiner—Helene Klemanski
(74) Attorney, Agent, or Firm—Rabin & Berdo, PC

(57) ABSTRACT

A composition of a fragrant ink, at least comprising a microcapsule compound, a colorant, a media, a dispersing agent, and an emulsifier, and a preparation method thereof are disclosed. The microcapsule compound encapsulates a fragrant agent for providing the fragrant ink with fragrance. The colorant provides the fragrant ink with at least one color. The media is used as a solvent. The dispersing agent is for evenly dispersing the microcapsule compound in the media. The emulsifier emulsifies the fragrant agent released from the microcapsule compound and evenly disperses the fragrant agent in the media.

30 Claims, 1 Drawing Sheet

FRAGRANT INK WITH MICROCAPSULE COMPOUNDS TO PROVIDE FRAGRANCE

This application incorporates by reference of Taiwan application Serial No. 090128260, filed Nov. 14, 2001.

BACKGROUND OF THE INVENTION

1. Field of the Invention

The invention relates in general to a composition of a fragrant ink, and more particularly to a fragrant ink composition, using microcapsule to encapsulate a fragrant agent.

2. Description of the Related Art

Organic additives, such as colorant, surfactant and pH buffer, used in ink, produce pungent irritating odor. Thus, manufacturing fragrant ink without the unpleasant odor is now of great interest.

Perfumes can be sorted as natural perfumes and synthetic perfumes by their origins. The natural perfumes are obtained from living beings by the separation steps such as extraction, condensation, oil pressing or distillation and can be categorized as plant-originated perfumes and animal-originated perfumes. The synthetic perfumes are manufactured by chemical synthesize. One of the categories is petrochemical perfume.

Perfumes can also be sorted into 5 grades by their contents of essence. (1) Parfum, also called condensed Eau de parfum, contains more than 20 wt % of essence. It is the highest grade. (2) Eau de parfum contains 15 to 20 wt % of essence, which is cheaper than parfum. (3) Eau de toilette contains 8 to 15 wt % of essence, which is more popular. (4) Eau de cologne contains 4 to 8 wt % of essence. Most male perfumes belong to this grade. (5) Eau fraiche contains 1 to 3 wt % of essence.

Perfumes can be categorized as flower perfumes and fancy perfumes. For flower perfumes, the floral fragrance like roses, jasmines or tuberoses is used as a base to manufacture perfumes with single floral fragrance perfumes or multi floral fragrance perfumes. Fancy perfume uses natural beings other than flowers as a base, to express forests, grasses, places, landscapes, characters, music or certain atmospheres.

Perfumes are blends of essences, water and ethanol. Most essences are oil-soluble and are not soluble in water. Ethanol has the drawbacks of low boiling point, high volatility, low durability, being lipo-phobic, and hard to emulsify. Thus, surfactant is frequently added to emulsify essences. By adding hydrophobic functional group at the oil-soluble essence particles, oil-in-water type emulsion is formed. To ensure the stability of the perfume, surfactants with proper percentage of long and short hydrophobic functional groups are required. (HLB) is proposed by Griffin to characterize surfactants. The hydrophilic-lipophilic balance (HLB) is an empirical number that describes the relationship between the hydrophilic (water-soluble) and lipophilic (oil-soluble) portions of a surfactant molecule. There are a number of ways to determine HLB. The general rule is to determine the ratio of liphophilic functional groups to the whole surfactant molecular. Surfactants with a strong lipophilic character have a low HLB, while the ones with a stronger hydrophilic value have a high HLB. The surfactants for perfumes can be also characterized by the solubility of spices in the surfactants. Alcohol type spices have higher solubility, ketone type spices have less and ester type spices have the lowest in the three.

U.S. Pat. No. 6,123,757 discloses a composition of a fragrant ink, including a alcohol, a chemical compound for forming images, an aromatic compound, deionized water and ethanol. The aromatic compound in the ink covers the pungent odor of the other ink ingredients and produces fragrance. In the invention, ethanol is chosen as a surfactant. However, ethanol is poor at emulsification. Ethanol is not able to dissolve the aromatic compounds completely in the inks, and therefore unable to effectively provide fragrance. Further more, the uneven dispersion often causes nozzle clogging. Also, ethanol has a low boiling point and high volatility, which leads the aromatic compounds to volatilize. As a result, the durability of the fragrance of the printed figures is greatly reduced. Moreover, inks with ethanol have low surface tension, which causes the printed words and figures to fade and spread.

SUMMARY OF THE INVENTION

It is therefore an object of the invention to provide a composition of fragrant ink, at least comprising a microcapsule compound, a colorant, a media, a dispersing agent, and an emulsifier. The microcapsule compound encapsulates a fragrant agent for providing the fragrant ink with fragrance. The colorant provides the fragrant ink with at least one color. The media is used as a solvent. The dispersing agent is for evenly dispersing the microcapsule compound in the media. The emulsifier emulsifies the fragrant agent released from the microcapsule compound and evenly disperses the fragrant agent in the media.

The fragrant agent can be a natural fragrant agent or a synthetic fragrant agent. The natural fragrant agent can be any one or any combination of the following: oil of rose, oil of cymbopogonmartini, oil of lena-batu, oil of sandal, rosemary, oil of lavender, oil of fennel, oil of jasmin, oil of cinnamon, oil of lilac, oil of Ylang-Ylang, oil of turpentine, musk, ciret, castreum or ambergris. The synthetic fragrant agent can be any one or any combination of the following: β-caryophyllene, linalool, α-terpineol, cinnamic aldehyde, salicylic aldehyde, allyl caproate, β-Ionone, maltol, musk ambrette, anethole, thymol, eugenol, isosafrol, benzoic acid, methyl phenylacetate, oxide ketone, or 1-bromo-2-phenylethylene. The microcapsule compound has a particle size less than 1 μm and a weight percentage of about 0.01 wt % to 10 wt %.

It is therefore a further object of the invention to provide a preparation method of forming a fragrant ink. The method comprises steps of: providing a media as a solvent; mixing a microcapsule compound in the medium to form a microcapsule compound solution, wherein the microcapsule compound encapsulates a fragrant agent for providing the fragrant ink with fragrance; mixing a colorant in the media, wherein the colorants provide the fragrant ink with at least one color; mixing a dispersing agent in the microcapsule compound solution to evenly disperse the microcapsule compound in the media; and mixing an emulsifier in the microcapsule compound solution to emulsify the fragrant agent released from the microcapsule compound and evenly dissolve the fragrant agent in the media.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
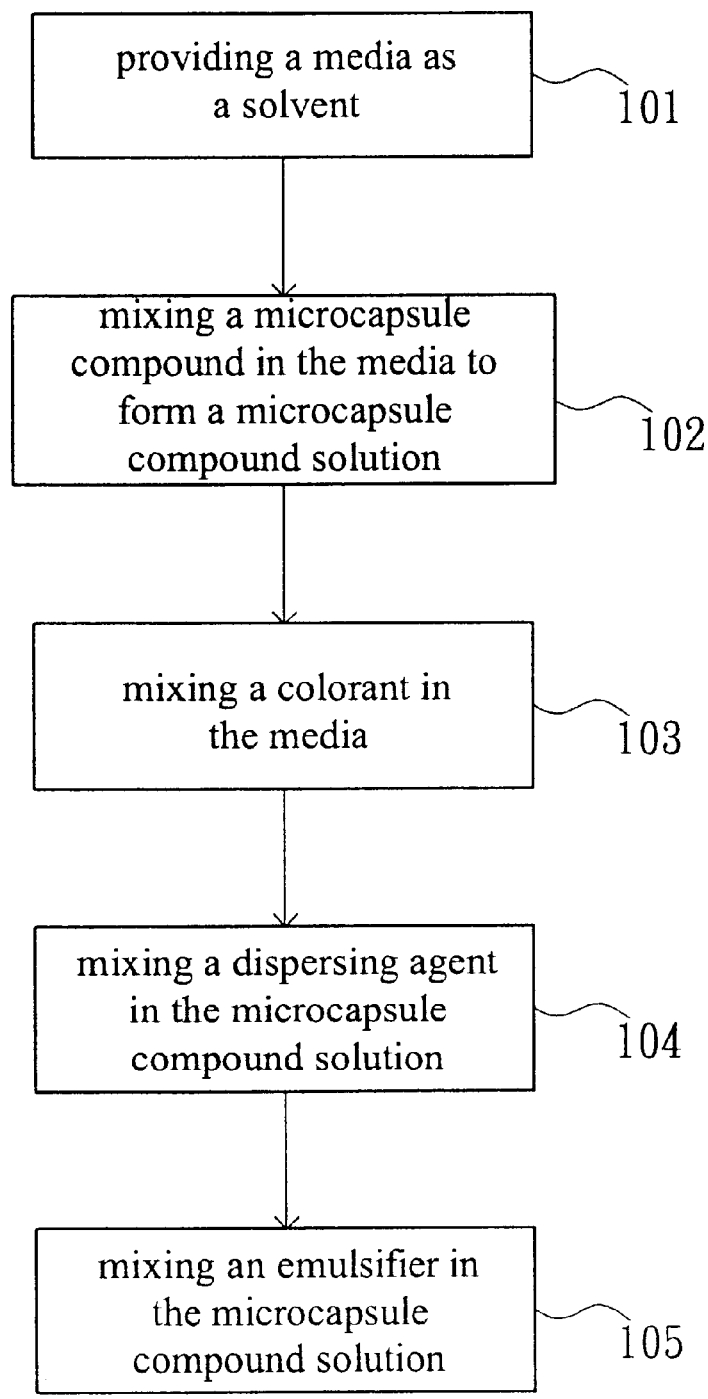
FIG. 1 shows a process flow chart of forming a fragrant ink of the invention.

The fragrant ink of the invention can be applied in ink-jet printing technology as well as screen process printing. Referring to FIG. 1, a process flow chart of forming a fragrant ink of the invention is shown. First, as shown in the step 101, a media as a solvent of the fragrant ink of the invention is provided. Then, as shown in the step 102, a microcapsule compound is mixed in the media to form a microcapsule compound solution. The microcapsule compound encapsulates a fragrant agent to provide the fragrant ink with fragrance. Then, as shown in the step 103, a colorant is mixed in the media. The colorant provides the fragrant ink with at least one color. Colorants with different colors can be applied to provide the fragrant ink with full color. Next, as shown in the step 104, a dispersing agent is mixed in the microcapsule compound solution to evenly disperse the microcapsule compound in the media. Then, as shown in the step 105, an emulsifier is mixed in the microcapsule compound solution to emulsify the fragrant agent released from the microcapsule compound and evenly dissolve the fragrant agent in the medium, which can be an aqueous system or an organic solvent system. The mixing ratio of the microcapsule compound to the dispersing agent is preferably between about 10:1 to about 1:10. The mixing ratio of the microcapsule compound to the emulsifier is preferably between about 10:1 to about 1:10.

The composition of a fragrant ink at least includes: a microcapsule compound for providing the fragrant ink with fragrance, a colorant for providing the fragrant ink with at least one color, at least one surfactant and at least one media. The surfactant includes a dispersing agent, an emulsifier, and an adhesion-aid. The media includes a pH buffer, a chelating agent, a biocide, a preservative, a humectant, an organic solvent and an UV absorbent.

The microcapsule of the invention encapsulates fragrant agent. The fragrant agent can be a natural fragrant agent, a synthetic fragrant agent or a mixture thereof. The natural fragrant agent can be any one or any combination of the following: oil of rose, oil of cymbopogonmartini, oil of lena-batu, oil of sandal, rosemary, oil of lavender, oil of fennel, oil of jasmin, oil of cinnamon, oil of lilac, oil of Ylang-Ylang, oil of turpentine, musk, ciret, castreum and ambergris. The synthetic fragrant agent can be any one or any combination of the following: β-caryophyllene, linalool, α-terpineol, cinnamic aldehyde, salicylic aldehyde, allyl caproate, β-lonone, maltol, musk ambrette, anethole, thymol, eugenol, isosafrol, benzoic acid, methyl phenylacetate, oxide ketone, and 1-bromo-2-phenylethylene.

The microcapsule compound of the invention encapsulates the fragrant agent to ensure lasting fragrance. During the process of microencapsulation, the fragrant is contained within a small, protective coating or shell, usually spherically shaped.

Microencapsulation is used extensively in time-release medicines and many products such as carbonless paper. In carbonless paper, dyes are contained within microcapsules which break upon pressure from a pen or typewriter. Microencapsulation packages micronized materials (both liquids and solids) in the form of capsules, which range in size from less than 1 μm to more than 300 μm. The capsule wall material can be formulated by using a wide variety of materials including natural and synthetic polymers. Microencapsulation can improve product performance and broaden product use by: (1) controlling the release of materials (2) protecting reactive components until time of release (3) allowing safe and conventional handling of toxic materials (4) extending shelf-life of drugs (5) protecting the environment (6) permitting liquids to be handled as solids.

The diameter of the microcapsule compound of the invention is controlled to be less than 1.0 μm to meet the size of a nozzle hole. The diameter of a nozzle hole of an ink-jet printer is typically about 30~50 μm. The weight percentage of the microcapsule compound is in a range between 0.01% to 10%. The dispersing agent in the microcapsule compound solution evenly disperses the microcapsule compound in the media; and the emulsifier emulsifies the fragrant agent released from the microcapsule compound and evenly dissolve the fragrant agent in the media.

The colorant used in the fragrant ink of the invention can be a dye or a pigment. The surfactant of the invention includes a dispersing agent, an emulsifier and an adhesion-aid. Surfactants applied in the ink of the invention can be anionic, nonionic, cationic, amphoteric surfactants or a mixture thereof. The weight percentage of the surfactant in the fragrant ink is about 1~20%. The weight percentage of the dispersing agent in the fragrant ink is about 0.05~30.0%. The composition of the dispersing agent can be CT-141 (from AIR PRODUCT), CT-151 (from AIR PRODUCT), OT-75 (from CYTEC), GPG (from CYTEC), OT-70PG (from CYTEC), polyethandiol, polypropandiol, EO/PO copolymer, BO/EO copolymer, sodium dioctyl sulfosuccinate, alkylene oxide adduct of acetylene glycol, polybutyl resin, cellulose derivative, styrene/acrylic copolymer resin, maleic acid/styrene copolymer and a polymer with both a hydrophilic segment and a hydrophobic segment.

The weight percentage of the emulsifier in the fragrant ink is about 0.05~30.0%. The composition of the emulsifier can be A-102 (from CYTEC), LF4 (from CYTEC), 1,3-BG (from KYOWA), OG (from KYOWA), BEPG (from KYOWA), PD-9 (from KYOWA), EP-810 (from AIR PRODUCT), AQUAROME AGENT 44 (from The Independent Fragrance), 2-propanol, di-1,2-propylene glycol, 2-pyrrolidone, N-methyl-2-pyrrolidone, 2,4,7,9-tetramethyl-5-decyne4,7-diol and 1,1,1-trimethylolpropane.

The media of the invention includes a pH buffer, a chelating agent, a biocide, a preservative, a humectant, an organic solvent and an UV absorbent. The pH buffer can be diethanolamine, triethanolamine, hydroxides of alkali metals, lithium hydroxide, sodium hydroxide, potassium hydroxide, ammonium hydroxide, carbonates of alkali metals, lithium carbonate, sodium carbonate or potassium carbonate.

The chelating agent of the invention can be sodium ethylenediaminetetraacetate, trisodium nitrilotriacetate, hydroxyethyl ethylenediamine trisodium acetate, diethylenetriamino pentasodium acetate, or uramil disodium acetate. The organic solvent of the invention can be cyclohexane, methanol, ethanol, ethylene glycol, diethylene glycol, triethylene glycol, polyethylene glycol, propylene glycol, butylenes glycol, pentylene glycol, hexylene glycol or poly hydric alcohol.

Instead of using ethanol as a solvent, the dispersing agent and the emulsifier are used to blend the microcapsule compound in the fragrant ink. It is proved that the physical properties, such as surface tension, pH value and optical density, are remained and the performance of the fragrant ink is maintained, even microcapsule compound is added.

To further understand the invention, the following two examples are taken.

EXAMPLE 1

The following is an example of the composition of the fragrant ink according to a preferred embodiment of the invention.

TABLE 1

| AGENT | AMOUNT (weight percentage) | COMPOUND |
|---|---|---|
| Fragrant Agent | 0.5% | Fragrant agent with apple breeze encapsulated in microcapsules |
| Colorant | 2% | Reactive Red Dye 180 (from Clariant) |
|  | 2% | Acidic Red 52 (from H.W.SANDS) |
| Humectant | 4% | PEG 200(polyethylene glycol 200, from U.C.C.) |
| Emulsifier | 4% | 2-pyrrolidone(from DOW) |
|  | 4% | AQUAROME AGENT 44 (from The Independent Fragrance) |
| Surfactant | 4% | EHMPD(from Lancaster) |
| Dispersing Agent | 5% | CT141 (from AIR PRODUCT) |
| Biocide | 0.5% | SL-700(from KYOWA) |
| Solvent | for balancing | Deionized water |

The ink-jet ink as disclosed in Table 1 is then used in a commercial ink-jet printer to print on a plain paper and a coating paper. The words and features in the document emit a pleasant scent of apple breeze and the pungent irritating odor of organic compounds in the ink-jet ink is covered.

EXAMPLE 2

The following is an example of the composition of the fragrant ink according to a preferred embodiment of the invention.

TABLE 2

| AGENT | AMOUNT (weight percentage) | COMPOUND |
|---|---|---|
| Fragrant Agent | 5% | Violet fragrant agent encapsulated in microcapsules |
| Colorant | 5% | Red amphoteric SR (from Kelly Chemistry) |
| Humectant | 4% | PEG 200 (polyethylene glycol 200, from U.C.C.) |
| Emulsifier | 4% | 2-pyrrolidone (from DOW) |
|  | 4% | AQUAROME AGENT 44 (from The Independent Fragrance) |
| Surfactant | 4% | EHMPD (from Lancaster) |
| Dispersing Agent | 5% | CT141 (from AIR PRODUCT) |
| Biocide | 0.5% | SL-700 (from KYOWA) |
| Organic Solvent | for balancing | Isopropanol |

The ink-jet ink as disclosed in Table 2 is then used in a commercial screen-printing machine to print on a coated art paper. The words and features in the document emit a pleasant scent of violet and the pungent irritating odor of organic compounds in the ink is covered.

It is therefore apparent for people skilled in the art that the fragrant ink of the invention can be applied in both ink-jet printing and screen printing without changing the physical properties, such as surface tension, pH value, an optical density. Moreover, because the fragrant agent is encapsulated in microcapsules, the fragrance lasts longer than conventional fragrant ink.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A composition of a fragrant ink, at least comprising:
   a microcapsule compound, which encapsulates a fragrant agent for providing the fragrant ink with fragrance;
   a colorant for providing the fragrant ink with at least one color;
   a media as a solvent;
   a dispersing agent for evenly dispersing the microcapsule compound in the media; and
   an emulsifier for emulsifying the fragrant agent released from the microcapsule compound and evenly dispersing the fragrant agent in the media.

2. The composition of the fragrant ink as claimed in claim 1, wherein the fragrant agent is a natural fragrant agent.

3. The composition of the fragrant ink as claimed in claim 2, wherein the natural fragrant agent is selected from the group consisting of: oil of rose, oil of cymbopogonmartini, oil of lena-batu, oil of sandal, rosemary, oil of lavender, oil of fennel, oil of jasmin, oil of cinnamon, oil of lilac, oil of Ylang-Ylang, oil of turpentine, musk, ciret, castreum and ambergris.

4. The composition of the fragrant ink as claimed in claim 1, wherein the fragrant agent is a synthetic fragrant agent.

5. The composition of the fragrant ink as claimed in claim 4, wherein the synthetic fragrant agent is selected from the group consisting of:
   β-caryophyllene, linalool, α-terpineol, cinnamic aldehyde, salicylic aldehyde, allyl caproate, β-lonone, maltol, musk ambrette, anethole, thymol, eugenol, isosafrol, benzoic acid, methyl phenylacetate, oxide ketone, and 1-bromo-2-phenylethylene.

6. The composition of the fragrant ink as claimed in claim 1, wherein the fragrant agent is a mixture of a natural fragrant agent and a synthetic fragrant agent.

7. The composition of the fragrant ink as claimed in claim 1, wherein the microcapsule compound has a particle size less than 1 μm.

8. The composition of the fragrant ink as claimed in claim 1, wherein the microcapsule compound has a weight percentage of about 0.01 wt % to 10 wt %.

9. The composition of the fragrant ink as claimed in claim 1, wherein the colorant is a dye and the media comprises an organic solvent.

10. The composition of the fragrant ink as claimed in claim 1, wherein the colorant is a pigment and the media comprises water solution.

11. The composition of the fragrant ink as claimed in claim 1, wherein the dispersing agent has a weight percentage of about 0.05 wt % to 30 wt %.

12. The composition of the fragrant ink as claimed in claim 1, wherein the dispersing agent is selected from the group consisting of:
   polyethandiol, polypropandiol, ethyleneoxy/propyleneoxy (EO/PO) copolymer, butyleneoxy/ethyleneoxy (BO/EO) copolymer, sodium dioctyl sulfosuccinate, alkylene oxide adduct of acetylene glycol, polybutyl resin, cellulose derivative, styrene/acrylic copolymer resin, maleic acid/styrene copolymer and a polymer with both a hydrophilic segment and a hydrophobic segment.

13. The composition of the fragrant ink as claimed in claim 1, wherein the emulsifier has a weight percentage of about 0.05 wt % to 30 wt %.

14. The composition of the fragrant ink as claimed in claim 1, wherein the emulsifier is selected from the group consisting of: 2-propanol, di-1,2-propylene glycol, 2-pyrrolidone, N-methyl-2-pyrrolidone, 2,4,7,9-tetramethyl-5-decyne-4,7-diol and 1,1,1-trimethylolpropane.

15. The composition of the fragrant ink as claimed in claim 1, wherein the media at least comprises a pH buffer, a chelating agent, a biocide, a preservative, a humectant, an organic solvent and an UV absorbent.

16. A preparation method of forming a fragrant ink, comprising the steps of:

providing a media as a solvent;

mixing a microcapsule compound in the media to form a microcapsule compound solution, wherein the microcapsule compound encapsulates a fragrant agent for providing the fragrant ink with fragrance;

mixing a colorant in the media, wherein the colorant provides the fragrant ink with at least one color;

mixing a dispersing agent in the microcapsule compound solution to evenly disperse the microcapsule compound in the media; and mixing an emulsifier in the microcapsule compound solution to emulsify the fragrant agent released from the microcapsule compound and evenly dissolve the fragrant agent in the media.

17. The preparation method of forming a fragrant ink as claimed in claim 16, wherein a mixing ratio of the microcapsule compound to the dispersing agent is between the range of about 10:1 to about 1:10.

18. The preparation method of forming a fragrant ink as claimed in claim 16, wherein a mixing ratio of the microcapsule compound to the emulsifier is between the range of about 10:1 to about 1:10.

19. The preparation method of forming a fragrant ink as claimed in claim 16, wherein the microcapsule compound encapsulates a natural fragrant agent.

20. The preparation method of forming a fragrant ink as claimed in claim 19, wherein the natural fragrant agent is selected from the group consisting of: oil of rose, oil of cymbopogonmartini, oil of lena-batu, oil of sandal, rosemary, oil of lavender, oil of fennel, oil of jasmin, oil of cinnamon, oil of lilac, oil of Ylang-Ylang, oil of turpentine, musk, ciret, castreum and ambergris.

21. The preparation method of forming a fragrant ink as claimed in claim 16, wherein the microcapsule compound encapsulates a synthetic fragrant agent.

22. The preparation method of forming a fragrant ink as claimed in claim 21, wherein the synthetic fragrant agent is selected from the group consisting of:

β-caryophyllene, linalool, α-terpineol, cinnamic aldehyde, salicylic aldehyde, allyl caproate, β-Ionone, maltol, musk ambrette, anethole, thymol, eugenol, isosafrol, benzoic acid, methyl phenylacetate, oxide ketone, and 1-bromo-2-phenylethylene.

23. The preparation method of forming a fragrant ink as claimed in claim 16, wherein the microcapsule compound encapsulates a natural fragrant agent and a synthetic fragrant agent.

24. The preparation method of forming a fragrant ink as claimed in claim 16, wherein the microcapsule compound has a particle size less than 1 μm.

25. The preparation method of forming a fragrant ink as claimed in claim 16, wherein the microcapsule compound has a weight percentage of about 0.01 wt % to 10wt %.

26. The preparation method of forming a fragrant ink as claimed in claim 16, wherein the dispersing agent is selected from the group consisting of:

polyethandiol, polypropandiol, ethyleneoxy/propyleneoxy (EO/PO) copolymer, butyleneoxy/ethyleneoxy (BO/EO) copolymer, sodium dioctyl sulfosuccinate, alkylene oxide adduct of acetylene glycol, polybutyl resin, cellulose derivative, styrene/acrylic copolymer resin, maleic acid/styrene copolymer and a polymer with both a hydrophilic segment and a hydrophobic segment.

27. The preparation method of forming a fragrant ink as claimed in claim 16, wherein the emulsifier is selected from the group consisting of: 2-propanol, di-1,2-propylene glycol, 2-pyrrolidone, N-methyl-2-pyrrolidone, 2,4,7,9-tetramethyl-5-decyne-4,7-diol and 1,1,1-trimethylolpropane.

28. The preparation method of forming a fragrant ink as claimed in claim 16, wherein the colorant is a dye and the media comprises an organic solvent.

29. The preparation method of forming a fragrant ink as claimed in claim 16, wherein the colorant is a pigment and the media comprises water solution.

30. A composition of a fragrant ink prepared by a method comprising the steps of:

providing a media as a solvent;

mixing a microcapsule compound in the media to form a microcapsule compound solution, wherein the microcapsule compound encapsulates a fragrant agent for providing the fragrant ink with fragrance;

mixing a colorant in the media, wherein the colorant provides the fragrant ink with at least one color;

mixing a dispersing agent with the microcapsule compound solution, wherein the dispersing agent evenly disperses the microcapsule compound in the media; and mixing an emulsifier with the microcapsule compound solution, wherein the emulsifier emulsifies the fragrant agent released from the microcapsule compound and evenly disperses the fragrant agent in the media.

* * * * *